United States Patent
Haga et al.

(10) Patent No.: US 6,345,430 B1
(45) Date of Patent: Feb. 12, 2002

(54) DAMPER

(75) Inventors: Hiroaki Haga, Chigasaki; Tsutomu Ishida, Fujisawa, both of (JP)

(73) Assignee: NOK-Vibracoustic Co., Ltd., Tokyo (JP)

( * ) Notice: Subject to any disclaimer, the term of this patent is extended or adjusted under 35 U.S.C. 154(b) by 0 days.

(21) Appl. No.: 09/698,180

(22) Filed: Oct. 30, 2000

Related U.S. Application Data

(62) Division of application No. 09/140,320, filed on Aug. 26, 1998, now Pat. No. 6,171,194.

(30) Foreign Application Priority Data

Nov. 28, 1997 (JP) ............................................. 9-341913

(51) Int. Cl.$^7$ ................................................ B23P 25/00
(52) U.S. Cl. ...................................... 29/458; 29/896.93
(58) Field of Search ........................... 29/896.93, 469.5, 29/458; 464/89, 87, 903; 192/209

(56) References Cited

U.S. PATENT DOCUMENTS

| | | | | |
|---|---|---|---|---|
| 3,903,350 A | * | 9/1975 | Baird | 156/332 X |
| 4,073,047 A | * | 2/1978 | Fishbaugh et al. | 29/450 |
| 4,556,130 A | * | 12/1985 | Puszakowski | 188/218 A |
| 4,961,254 A | * | 10/1990 | Andra et al. | 464/89 X |
| 5,168,774 A | * | 12/1992 | Andra et al. | 464/89 X |
| 5,377,962 A | * | 1/1995 | Ochs et al. | 267/281 |
| 5,388,481 A | * | 2/1995 | Andra | 74/574 |
| 5,562,544 A | * | 10/1996 | Ochs et al. | 464/89 |
| 5,956,836 A | * | 9/1999 | Dupuie | 29/469.5 |
| 5,988,015 A | * | 11/1999 | Riu | 464/90 X |
| 6,068,555 A | * | 5/2000 | Andra et al. | 464/93 |
| 6,171,194 B1 | * | 1/2001 | Haga et al. | 464/89 |

FOREIGN PATENT DOCUMENTS

| | | | | |
|---|---|---|---|---|
| GB | 2233424 | * | 1/1991 | 464/89 |
| JP | 60-024928 | | 2/1985 | |
| JP | 60-141532 | | 7/1995 | |

* cited by examiner

*Primary Examiner*—S. Thomas Hughes
*Assistant Examiner*—Essama Omgba
(74) *Attorney, Agent, or Firm*—Jacobson Holman, PLLC

(57) ABSTRACT

To substantially increase a slide torque of a fitting type damper formed by press-fitting, an elastic body of a rubber-like elastic material is located between a hub and a massive body from either direction of a shaft. Polymethylene-polyphenyl-polyisocyanate is interposed as a non-slide agent between hub including a metallic part at a boundary of an elastic body or between a massive body including a metallic part at an opposite boundary of the elastic body.

4 Claims, 1 Drawing Sheet

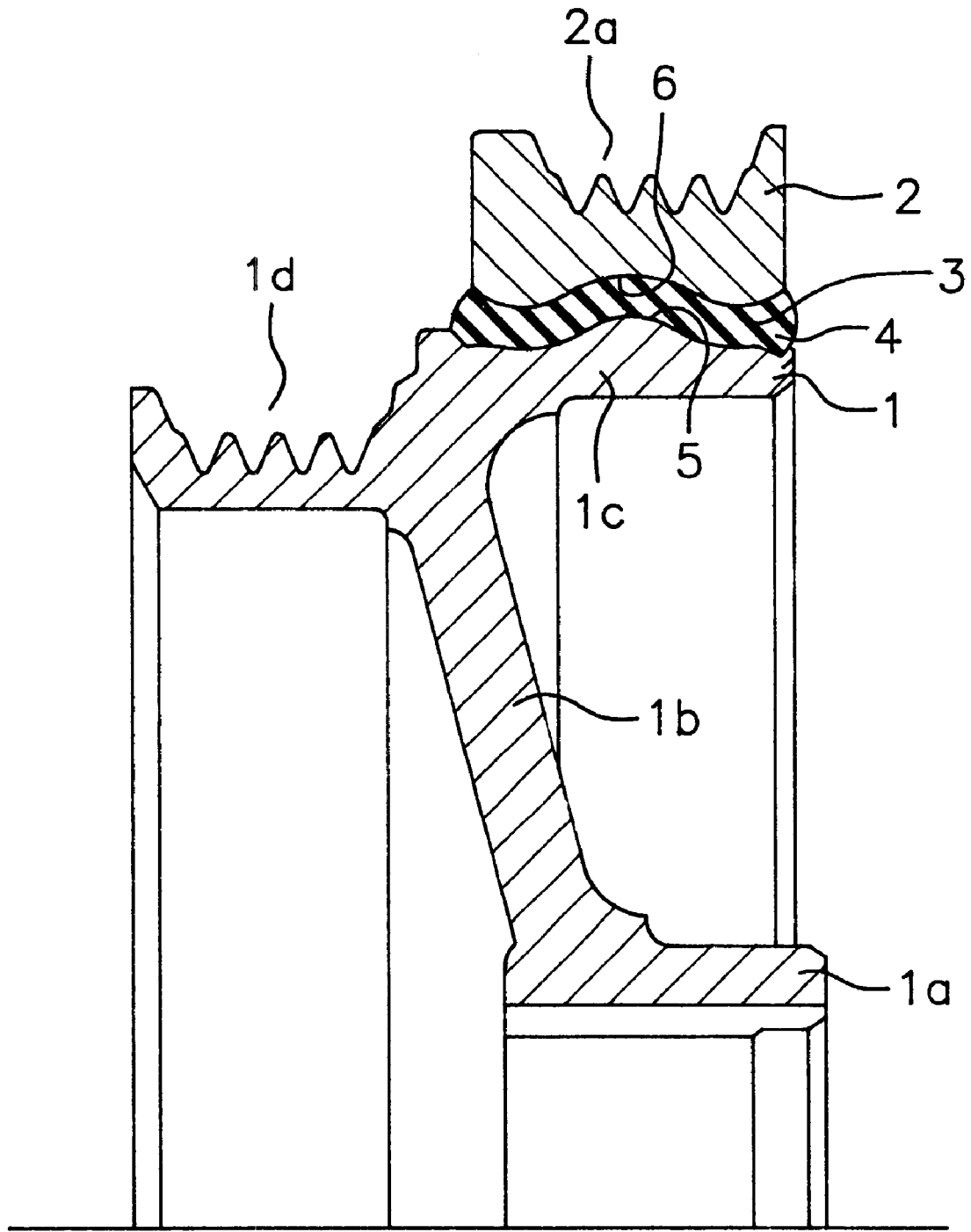

DAMPER

This is a Divisional of application Ser. No. 09/140,320 filed Aug. 26, 1998 now U.S. Pat. No. 6,171,194.

BACKGROUND OF THE INVENTION

1. Field of the Invention

This invention relates to a damper, and more particularly, to a torsional damper for absorbing torsional vibration occurring in a rotation driving system such as a crankshaft of an internal combustion engine, or the like.

2. Description of the Related Art

Conventionally, a torsional damper connecting a hub with a massive body via an elastic body of a rubber-like elastic material has been well known, and as a kind of it, a fitting type torsional damper has been known which is formed by press-fitting an elastic body of a rubber-like elastic material into a space between the hub and the massive body from either direction of the shaft.

However, since this fitting type torsional damper is not bonded by vulcanization adhesion, there is such an inconvenience that slides occurs, at a time of a heavy load condition, between the hub comprised of metallic parts and the elastic body or between the massive body comprised of metallic parts and the elastic body in the direction of the rotation.

To increase (improve) a slide torque for preventing this slide, mechanical methods have conventionally been employed such as a fitting surface of the hub or the massive body is treated by shot-blasting or the like to give these surfaces unevenness, or stickiness is provided on a surface of the elastic body, etc. However, either of these methods has had an insufficient effect so far.

For example, as is described in Japanese Patent Tokkai Sho 60-141532, adhesives such as a chlorinated rubber as a main ingredient is applied to a place between the hub and the elastic body or a place between the massive body and the elastic body. However, a conventional adhesive has an insufficient effect in an adhesive strength, or to the contrary, an adhesive strength is so tight that ill influence on other properties such as durability or the like tend to come out.

In view of the above-mentioned aspects, an object of the present invention is to provide a fitting type damper permitting to substantially increase a slide torque, especially, to provide a fitting type damper permitting to substantially increase a slide torque at initial stage as well as a slide torque even after heat-aging, endurance tests, or the like.

Another object of the present invention is to provide a process for manufacturing a fitting type damper permitting a substantial increase in slide torque at an initial stage as well as a slide torque even after heat-aging, endurance tests, or the like.

SUMMARY OF THE INVENTION

In order to achieve the above objects, the damper according to this invention, in a fitting type damper formed by press-fitting an elastic body of a rubber-like elastic material between the hub and the massive body in either direction of the shaft, has polymethylene-polyphenyl-polyisocyanate as a non-slide agent which is interposed between said hub comprised of metallic materials and a boundary of said elastic member or between said massive member comprised of metallic materials and a boundary of said elastic member.

It is an object of the present invention to increase a slide torque by a chemical method instead of a conventional mechanical method mentioned above and to increase a holding power of a metallic part and an elastic body by interposing a non-slide agent between the metallic parts and the elastic body (rubber). As a result of our intensive research to obtain an excellent sliding torque and also to avoid a deteriorating influence on other properties, polymethylene-polyphenyl-polyisocyanate has specifically been determined as a kind of the non-slide agent.

Polymethylene-polyphenyl-polyisocyanateis is shown by the following formula:

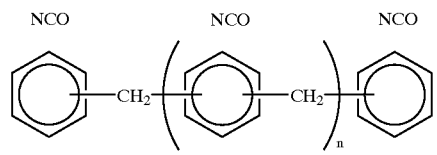

Wherein $n \geq 0$.

Polymethylene-polyphenyl-polyisocyanate is interposed between the hub comprised of metallic parts and the boundary of the elastic body, or between the massive body comprised of metallic parts and the boundary of the elastic body and non-slide effect can be obtained respectively. Another applying method is that polymethylene-polyphenyl-polyisocyanate is interposed both between the hub comprised of metallic parts and the boundary of the elastic body and between the massive body comprised of metallic parts and the boundary of the elastic body, and the non-slide effect can be obtained both at the place between the hub and the elastic body and between the massive body and the elastic body at the same time.

The damper of the present invention is obtained by the following procedures:

a. Applying a non-slide agent having polymethylene-polyphenyl-polyisocyanate onto at least one of a surface selected from a group of an outer peripheral surface of the outer peripheral side of the hub or an inner peripheral surface of the massive body or a surface of the elastic body, b. Drying the hub or massive body or the elastic body so as to prevent from dripping of polymethylene-polyphenyl-polyisocyanate, c. Press-fitting an elastic body between the hub and the massive body to form an assembly, d. Cleaning the assembly in a solvent to remove dusts, and e. Heating the assembly to react the none-slide agent.

Applying process and press-fitting process is essential for the present invention. But drying, cleaning and heating processes can be eliminated from the processes, for example, in order to cut the cost of the production.

Applying the polymethylene-polyphenyl-polyisocyanate onto the surface of the hub or the massive body can be achieved by spray coating, brush coating or immersion coating or the like. The polymethylene-polyphenyl-polyisocyanate can be applied onto the hub only or the massive body only or both of these metal parts, or onto the elastic body only or both of the elastic body and the metal parts. And then the elastic body is press-fitted into the space between the hub and the massive body to assemble a damper.

It is essential that the non-slide agent comprises polymethylene-polyphenyl-polyisocyanate. Other chemical agents or solvents may be added into polymethylene-polyphenyl-polyisocyanate so far as substantial non-slide effect of the present invention can be observed.

Referring to the heating process, it is not necessarily to take this procedure because the reaction of polymethylene-polyphenyl-polyisocyanate occurs slowly under even at room temperature. But it is desirable to warm the assembly to accelerate the reaction speed. The desirable temperature of the heating process is not lower than 70° C. because the reaction speed is considerably slow under this temperature, and not higher than the temperature that the elastic material can be decomposed. If NBR (acrylonitrile butadiene rubber) is used for the elastic material, for example, the desirable heating temperature is around 120° C. and caution must be paid to keep the temperature not more than 170° C. to avoid the decomposition of the rubber.

Almost all rubber like materials may be used in the present invention. Blend rubber can also be used. NBR, EPDM, VAMAC, EPDM/VMAC rubber can be used preferably. Vulcanized rubber is more preferably used in the present invention.

BRIEF DESCRIPTION OF THE DRAWING

The FIGURE shows a semi-sectional view of the damper relating to the configuration of the embodiment of the present invention.

DETAILED DESCRIPTION OF THE PREFERRED EMBODIMENTS

Next, a configuration of the preferred embodiment of this invention is described by referring to the drawing.

As shown in the FIGURE, a massive body (also called a vibration ring) 2 is concentrically arranged on an outer peripheral side of the hub 1 mounted on an outer periphery of an end portion of a crankshaft (not shown) which is connected with an internal combustion engine of an automobile engine or the like, and a gap 3 is arranged between both parts 1, 2, namely, where an elastic body 4 (also called a rubber ring) is press-fitted into this gap 3 from either direction of the shaft, and the hub and the massive body 2 are coupled to each other via the elastic body 4.

The hub 1 is annularly formed from a given metal and integrates an inner peripheral side cylindrical part 1a to be mounted on the shaft, a disk part 1b, and an outer peripheral side cylindrical part 1c in one body, and the massive body 2 is coupled to the peripheral portion of this outer peripheral side cylindrical part 1c via the elastic body 4. The massive body 2 is annularly formed from a given metal. The elastic body 4 is annularly formed from a given rubber-like elastic material (vulcanized rubber). Moreover, endless belts (not shown are entrained on each of the hub 1 and the massive body 2, which are provided with pulley parts 1d, 2a for communicating rotary torque to each auxiliary machine (not shown).

The elastic body 4 has a stock allowance to be press-fitted and fixed between the hub 1 and the massive body 2, however, the arrangement of only this stock allowance can cause sometimes a slide between the hub 1 and the elastic body 4 or between the massive body 2 and the elastic body 4 in the direction of a rotation at a time of a heavy load condition as described above.

Therefore, in the configuration of this embodiment, polymethylene-polyphenyl-polyisocyanate is interposed between the hub 1 and the elastic body 4 at the boundary 5 and also between the massive body 2 and the elastic body 4 at the boundary 6 respectively as a non-slide agent for substantially increasing a slide torque (a critical torque for a slide occurrence) by the means. Polymethylene-polyphenyl-polyisocyanate is applied at least to the outer peripheral surface of the outer peripheral side cylindrical part 1c of the hub 1 and the inner peripheral surface of the massive body 2.

Next, evaluation tests were carried out in order to check the function and effect by the above configuration and so the contents of the tests are described below. The test conditions were as follows:

A rubber material of the elastic body (NBR compound)
<Compound for Examination>

| | |
|---|---|
| Nipol DN401 (Nippon Zeon.) | 100 (phr) |
| Seast 300 (Tokai Carbon Inc.) | 68 |
| Haku Enka cc (Shiraishi Kogyo Inc.) | 5 |
| ZnO | 5 |
| Stearic Acid | 1 |
| Antigen AS (Sumitomo Kagaku Kogyou Inc.) | 2 |
| Antigen 3C (Sumitomo Kagaku Kogyou Inc.) | 2 |
| Dioctyl Sebacate | 10 |
| Sulfur | 1 |
| Sokusinole NBS (Sumitomo Kagaku Inc.) | 2 |
| Sokusinole TBT (Sumitomo Kagaku Inc.) | 1 |
| Sokusinole TS (Sumitomo Kagaku Inc.) | 1 |
| Total | 198 |

Configuration of the torsion damper:
<Shape and Dimensions>

A torsion damper for the above tests was defined to have a shape as shown in FIG. 1, and an outer diameter of 163 mm was adopted.
<Manufacture or Treatment>

The torsion damper shown in the FIGURE was manufactured by the following processes:

a. The non-slide agent was applied to metallic part by spraying b. Dried in a room temperature (10 minutes)

c. Elastic body was press-fitted between the metallic parts d. The press-fitted assembly was cleaned (cleaned with methylene chloride)

e. Heated in a constant temperature oven (120° C.×22 hours )

f. Slide torque evaluation test was performed

<Kinds of Non-slide Agents and Method of Machining the Metallic Parts>

As shown in Table 1 below.
<Results>
As shown in Table 2 below.

As shown in the measurement results of this Table 2, it is possible to confirm that a new assembly could substantially be increased in a slide torque, and that it was also excellent in heat resistance, durability and in corrosion resistance, and further that the slide torque was substantially increasable at the initial stage as well as even after heat-aging, or after an endurance test, etc.

The present invention shows the following effects:

Namely, the damper in accordance with the present invention is a fitting type damper formed by press-fitting an elastic body of a rubber-like elastic material between a hub and a massive body from a direction parallel to the shaft, and polymethylene-polyphenyl-polyisocyanate is interposed as a non-slide agent between the hub comprised of metallic parts and the boundary of the elastic body or between the massive body comprised of metallic parts and the boundary of the elastic body, and thus, a new assembly can substantially be increased in a slide torque and is also excellent in heat resistance, durability, and corrosion resistance, and further, the slide torque is substantially increasable at the initial stage or even after heat-aging, and an endurance test, etc. Therefore, the non-slide agent makes the metallic parts and elastic body resistant to slides in the direction of the rotation, and permits to provide a damper product having an excellent vibration damping performance even at a time of a heavy load condition.

TABLE 1

| | Nonslide agent | Metallic part working | Name of chemical (Name of manufacturer) |
|---|---|---|---|
| Comparison Example 1 | None | None | |
| Comparison Example 2 | None | Shot-blasting | |
| Comparison Example 3 | Epoxy type | None | ADEKA RESIN EP4042 (ASAHI DENKA IND., CO.) |
| Comparison Example 4 | Phenol type | None | PHENOLITE 2639 (DAINIPPON INK $ CHEMICAL CO.) |
| Comparison Example 5 | Water soluble Urethane type | None | ADEKA BON-TIGHTER HUX 232 (ASAHI DENKA IND., CO.) |
| Comparison Example 6 | Vulcanizing Adhesive type | None | CHEMLOK 252 (ROAD FAR EAST) |
| Embodiment 1 | Polymethylene polyphenil-polyisocianate *) | None | ADEKA BON-TIGHTER UCX 853 (ASAHI DENKA IND., CO.) |

*) in the chemical formula, this polymethylene-polyphenyl-polyisocyanate is a mixture of about 40 weight % of n = 0, about 25 weight % of n = 1, about 10 weight % of n = 2 and about 25 weight % of n ≧ 3.

TABLE 2

| Heating Condition | Skid torque (kgf-m):Torque sliding between rubber and a metallic part by loading in torsional direction 120° C.-22 h (air-heating in constant temp. oven for reaction of nonslide material) | | | | |
|---|---|---|---|---|---|
| Measuring Condition | New assembly | After 100° C.-300 h | After 120° C.-300 h | After steeped in warm water *1 | After enduarance test *2 |
| Comparison Example 1 | 50 | 42 | 34 | 45 | 24 |
| Comparison Example 2 | 56 | 52 | 38 | 53 | 26 |
| Comparison Example 3 | 54 | 46 | 38 | 48 | 30 |
| Comparison Example 4 | 57 | 50 | 40 | 48 | 32 |
| Comparison Example 5 | 56 | 52 | 41 | 46 | 32 |
| Comparison Example 6 | 68 | 58 | 50 | 44 | 48 |
| Embodiment 1 | 86 | 78 | 74 | 79 | 75 |

*1: After steeped in warm water . . . Skid torque was measured after steeped in 80° C. water for 150 hours.
*2: After an endurance test . . . A fixed torsion endurance test was carried out 3,000,000 times (rubber temp. = 80° C.) after heat-aging at 100° C. for 300 hours, and then, slide torque was measured.

What is claimed is:

1. A process for manufacturing a fitting type damper formed by press-fitting an elastic body of a rubber-like elastic material between a hub and a massive body from either direction of a shaft, the process comprising the following steps:
   a) applying a non-slide agent including polymethylene-polyphenyl-polyisocyanate directly onto at least one of an outer peripheral surface of an outer peripheral side of the hub or an inner peripheral surface of the massive body or a surface of the elastic body, and
   b) press-fitting the elastic body between the hub and the massive body into contact with the hub and the massive body to form an assembly with the non-slide agent interposed in direct contact therebetween.

2. A process for manufacturing a fitting type damper according to claim 1, wherein the process is further comprised of drying the hub or massive body or the elastic body after the applying of the non-slide agent.

3. A process for manufacturing a fitting type damper according to claim 1, wherein the process is further comprised of heating the assembly to react the non-slide agent after the press-fitting of the elastic body.

4. A process for manufacturing a fitting type damper according to claim 1, wherein the process is further comprised of cleaning the assembly in a solvent to remove dust after the press-fitting of the elastic body.

* * * * *